US012458467B2

(12) United States Patent
Potts et al.

(10) Patent No.: US 12,458,467 B2
(45) Date of Patent: Nov. 4, 2025

(54) SYSTEMS AND METHODS FOR AUGMENTED REALITY-AIDED IMPLANT PLACEMENT

(71) Applicant: XIRONETIC LLC, Oklahoma City, OK (US)

(72) Inventors: Jeffrey Potts, Oklahoma City, OK (US); Brandon Strong, Emeryville, CA (US)

(73) Assignee: XIRONETIC LLC

( * ) Notice: Subject to any disclaimer, the term of this patent is extended or adjusted under 35 U.S.C. 154(b) by 0 days.

(21) Appl. No.: 19/007,074

(22) Filed: Dec. 31, 2024

(65) Prior Publication Data

US 2025/0213322 A1 Jul. 3, 2025

Related U.S. Application Data

(60) Provisional application No. 63/616,626, filed on Dec. 31, 2023.

(51) Int. Cl.
*A61B 90/00* (2016.01)
*A61B 34/00* (2016.01)
(Continued)

(52) U.S. Cl.
CPC .............. *A61B 90/37* (2016.02); *A61B 34/20* (2016.02); *G06T 19/006* (2013.01); *A61B 2034/2065* (2016.02); *A61B 2034/2072* (2016.02); *A61B 2034/252* (2016.02); *A61B 2090/365* (2016.02); *A61B 2090/367* (2016.02); *A61B 2560/0223* (2013.01); *G06T 2210/41* (2013.01)

(58) Field of Classification Search
None
See application file for complete search history.

(56) References Cited

U.S. PATENT DOCUMENTS 11,638,613 B2 * 5/2023 Murphy ................ A61B 90/36
600/407
11,992,373 B2 * 5/2024 Calloway .............. A61B 34/20
(Continued)

OTHER PUBLICATIONS

International Search Report received and Written opinion received for PCT Patent Application No. PCT/US2024/062395, mailed on Feb. 14, 2025, 18 pages.
(Continued)

*Primary Examiner* — David H Chu
(74) *Attorney, Agent, or Firm* — ArentFox Schiff LLP

(57) ABSTRACT

A system calculates a difference in position and orientation between a first physical marker attached to an implant and a second physical marker attached to a calibration rig comprising a physical replica of an anatomical portion of a patient where the implant is to be placed. The system generates, for display using the AR device, a three-dimensional representation of medical imaging data overlaid on the anatomical portion of the patient. The system determines, based on the difference, a target virtual position and target orientation on the three-dimensional representation where the first physical marker of the implant should be guided to ensure the implant is placed in the anatomical portion. The system generates, for display using the AR device, a first virtual marker at the target virtual position in the target orientation.

18 Claims, 12 Drawing Sheets

(51) Int. Cl.
   *A61B 34/20*   (2016.01)
   *G06T 19/00*   (2011.01)

(56) References Cited

U.S. PATENT DOCUMENTS

| | | | |
|---|---|---|---|
| 12,053,247 B1* | 8/2024 | Chiou | G06F 3/011 |
| 2013/0267838 A1* | 10/2013 | Fronk | A61B 5/064 |
| | | | 600/424 |
| 2015/0209119 A1 | 7/2015 | Theodore et al. | |
| 2016/0225192 A1* | 8/2016 | Jones | G06F 3/017 |
| 2017/0056115 A1* | 3/2017 | Corndorf | A61N 1/372 |
| 2018/0049622 A1* | 2/2018 | Ryan | A61B 1/00048 |
| 2018/0140362 A1* | 5/2018 | Calì | A61B 34/10 |
| 2018/0168740 A1* | 6/2018 | Ryan | A61B 90/36 |
| 2021/0177522 A1 | 6/2021 | Boddington et al. | |
| 2021/0192759 A1* | 6/2021 | Lang | A61B 90/98 |
| 2022/0054200 A1 | 2/2022 | Wang | |
| 2022/0265355 A1* | 8/2022 | Ferrante | A61B 34/10 |
| 2022/0287676 A1* | 9/2022 | Steines | A61B 6/102 |
| 2022/0361958 A1 | 11/2022 | Manwaring et al. | |
| 2023/0410445 A1* | 12/2023 | Elimelech | H04N 13/167 |
| 2024/0312141 A1* | 9/2024 | Demanget | A61B 34/10 |
| 2024/0377640 A1* | 11/2024 | Asaban | H04N 13/239 |
| 2025/0049514 A1* | 2/2025 | Dorman | A61B 34/20 |

OTHER PUBLICATIONS

Ochandiano et al., "Computer-Assisted Dental Implant Placement Following Free Flap Reconstruction: Virtual Planning, CAD/CAM Templates, Dynamic Navigation and Augmented Reality", Frontiers in Oncology, Available online at: <https://www.frontiersin.org/journals/oncology/articles/10.3389/fonc.2021.754943/full>, vol. 11, Article 754943, Jan. 28, 2022, pp. 1-16.

* cited by examiner

SYSTEMS AND METHODS FOR AUGMENTED REALITY-AIDED IMPLANT PLACEMENT

CROSS-REFERENCE TO RELATED APPLICATION

This application claims the benefit of U.S. Provisional Application No. 63/616,626, filed Dec. 31, 2023, which is herein incorporated by reference in its entirety.

FIELD OF TECHNOLOGY

The present disclosure relates to the field of computer vision, and, more specifically, to systems and methods for augmented reality-aided implant placement.

BACKGROUND

Many applications of extended reality in medicine aim to display preoperative digital imaging data in a spatially accurate alignment, or "registration," relative to the physical patient to provide a positional reference for the surgeon. For example, this principle may be applied to locate a tumor in three dimensions relative to the physical patient, as opposed to referencing traditional two-dimensional radiology data on a monitor. Such intuitive visualizations of patient data can improve patient outcomes, shorten the duration of surgery, and allow for novel surgical techniques to be used.

In addition to visualizing three-dimensional imaging data superimposed on the patient, virtual guides may be provided for implant placement, registered alongside the imaging data. Augmented reality (AR), a form of extended reality, allows for the simultaneous co-visualization of the physical patient with three-dimensional digital imaging overlays. By registering the three-dimensional imaging and virtual implant guides to the physical patient, a surgeon may have a useful reference for the target placement of an implant as determined from preoperative planning.

Virtual implant guides are known in the art to provide a useful reference for larger implants, including orthopedic implants such as acetabular cups. However, current AR head-mounted displays have limitations on display resolution and registration accuracy, which are best suited for larger-scale implant placement guidance.

SUMMARY

In view of the shortcomings of current virtual implant guides, there exists a need for systems and methods for smaller-scale implants and/or implants with complex geometry. Aspects of the present disclosure describe systems and methods for using AR to guide the accurate placement of implants, illustrated by the concept of an orbital implant, which is a preferred application but not a limiting use of the invention. The systems and methods disclosed herein provide an advancement over the state of the art by combining a novel process to associate a relative position between an implant and a surgical instrument used to place or position said implant. This approach utilizes the concept of a calibration fixture and calibration method to create a spatially oriented projection of a virtual fiducial marker, which can provide a proxy for a target implant position that is more easily interpreted by the user than a visual overlay of where the implant should reside on the patient. Furthermore, the use of a virtual fiducial marker for implant placement alleviates errors in placement, such as depth error, by simplifying the interpretation of the scene by the user. As illustrated herein, the method is generalizable to a variety of implants, calibration rig designs, and instruments.

In one exemplary aspect, techniques described herein relate to a method for implant placement using an augmented reality (AR) device, the method including: calculating a difference in position and orientation between a first physical marker attached to an implant and a second physical marker attached to a calibration rig representing an anatomical portion of a patient where the implant is to be placed; generating, for display using the AR device, a three-dimensional representation of medical imaging data overlaid on the anatomical portion of the patient; determining, based on the difference, a target virtual position and target orientation on the three-dimensional representation where the first physical marker of the implant should be guided to ensure the implant is placed in the anatomical portion; generating, for display using the AR device, a first virtual marker at the target virtual position in the target orientation.

In some aspects, the techniques described herein relate to a method, wherein the first virtual marker matches a visual appearance of the first physical marker.

In some aspects, the techniques described herein relate to a method, wherein an alignment of the first virtual marker and the first physical marker is indicative of proper placement of the implant in the anatomical portion.

In some aspects, the techniques described herein relate to a method, further including outputting an alert indicative of the proper placement in response to detecting that the first physical marker aligns with the first virtual marker.

In some aspects, the techniques described herein relate to a method, wherein the alert is one or more of: a visual indication, an audio indication, and a haptic indication.

In some aspects, the techniques described herein relate to a method, the first physical marker is attached to a surgical instrument temporarily connected to the implant.

In some aspects, the techniques described herein relate to a method, further including: determining an offset between the implant and a point of connection of the first physical marker on the surgical instrument; and adjusting the target virtual position and the target orientation based on the offset.

In some aspects, the techniques described herein relate to a method, wherein the first physical marker is one or a combination of: an optical code, an infrared retroreflective sphere, and an electromagnetic tracker.

In some aspects, the techniques described herein relate to a method, wherein the three-dimensional representation of the medical imaging data is generated using a plurality of individual medical images of at least the anatomical portion.

In some aspects, the techniques described herein relate to a method, wherein generating the three-dimensional representation of the medical imaging data includes registering the three-dimensional representation over the anatomical portion.

In some aspects, the techniques described herein relate to a method, wherein the calibration rig comprises a physical replica of the anatomical portion.

It should be noted that the methods described above may be implemented in a system comprising at least one hardware processor and memory. Alternatively, the methods may be implemented using computer executable instructions of a non-transitory computer readable medium.

In some aspects, the techniques described herein relate to a system for implant placement, including: an augmented reality (AR) device; at least one memory; and at least one hardware processor coupled with the at least one memory and configured, individually or in combination, to: calculate a difference in position and orientation between a first physical marker attached to an implant and a second physical marker attached to a calibration rig representing an anatomical portion of a patient where the implant is to be placed; generate, for display using the AR device, a three-dimensional representation of medical imaging data overlaid on the anatomical portion of the patient; determine, based on the difference, a target virtual position and target orientation on the three-dimensional representation where the first physical marker of the implant should be guided to ensure the implant is placed in the anatomical portion; generate, for display using the AR device, a first virtual marker at the target virtual position in the target orientation.

In some aspects, the techniques described herein relate to a non-transitory computer readable medium storing thereon computer executable instructions for implant placement using an augmented reality (AR) device, including instructions for: calculating a difference in position and orientation between a first physical marker attached to an implant and a second physical marker attached to a calibration rig representing an anatomical portion of a patient where the implant is to be placed; generating, for display using the AR device, a three-dimensional representation of medical imaging data overlaid on the anatomical portion of the patient; determining, based on the difference, a target virtual position and target orientation on the three-dimensional representation where the first physical marker of the implant should be guided to ensure the implant is placed in the anatomical portion; generating, for display using the AR device, a first virtual marker at the target virtual position in the target orientation.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
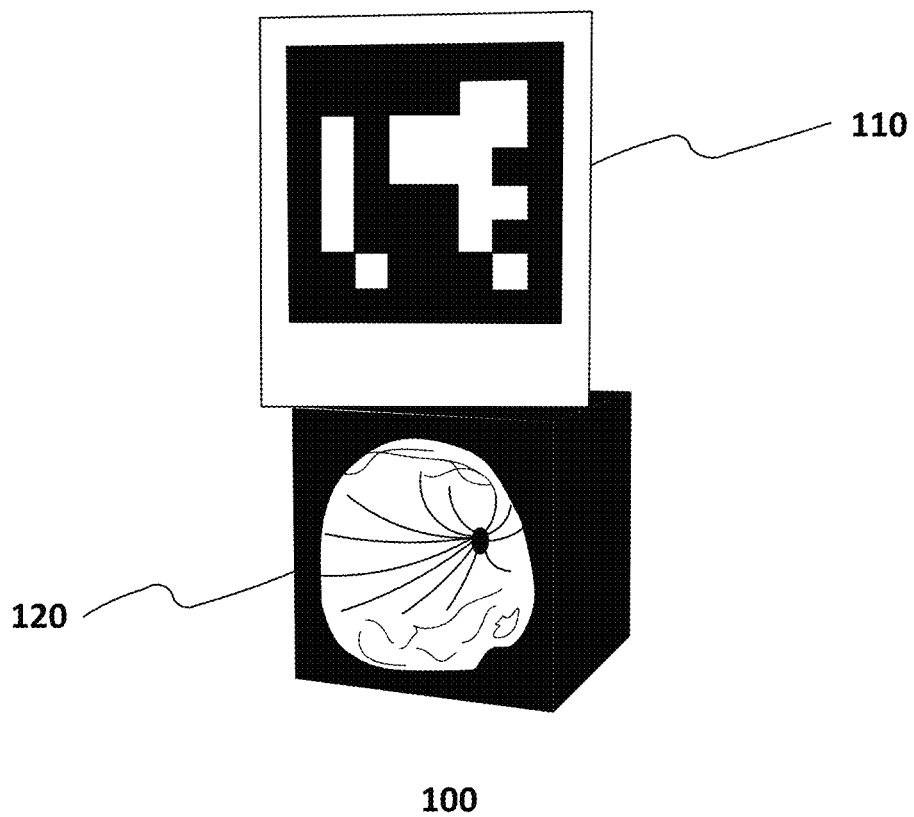
FIG. 1 is a diagram of a fiducial marker and a calibration rig construction representing a physical replica of an orbit of a patient.

Exemplary aspects are described herein in the context of a system, method, and computer program product for augmented reality-aided implant placement. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes systems and methods for placing three-dimensional data for visualization during a medical operation or surgical procedure using extended reality, which is a general term for technologies such as augmented, mixed, and virtual reality. In augmented and mixed reality, digital information is overlaid on the physical world of the observer. The digital information may include three-dimensional data such as models of the internal anatomy of a patient that a surgeon can use as a guide during an operation. Moreover, digital information may include virtual guides that show the optimal placement of an implant or surgical instrument.

A system of the present disclosure comprises an augmented reality (AR) head-mounted display executing a software referred to as an implant placement component, a set of at least two optical markers, an implant (herein, illustrated by an orbital implant), a surgical instrument, and a physical replica of the anatomy (herein, illustrated by an orbital cavity reconstruction) of patient. The physical replica may be made through an additive manufacturing process.

The present disclosure further describes a process for the manufacture of the physical replica, along with the process for utilization of the system. The components of the system advantageously combine together to provide a method that is more advanced than the state of the art and is clinically useful in performing, for example, an orbital implant placement in surgery. As will be evident in the proceeding sections, the systems and methods may be applied in many other operative contexts beyond orbital implant placement.

The AR head-mounted display is equipped with at least one optical camera for viewing the scene, along with onboard memory and processing for running software such as an implant placement component that detects and performs calculations on optical markers present in the scene. The AR head-mounted display runs an implant placement component for registering the three-dimensional imaging to the physical patient. The AR headset may be of any type that is commercially available or otherwise. An example of a suitable headset is the Microsoft Hololens 2™.

The fiducial markers may utilize a variety of constructions and patterns known in the art, such as infrared trackers or ArUco markers, but may need to be predefined prior to the surgical case or selected during the case, and these selections may be communicated with the AR headset or stored in its memory. The fiducial markers are used by the AR headset to detect the positions of specific components and critically to perform a calibration of the system. In this context, "calibration" refers to the process of assigning a relative offset between two objects in the scene, as calculated by the implant placement component, so that a virtual implant guide may be subsequently provided to the surgeon.

In some aspects, the systems and methods may also include a calibration rig used to calculate the pose, or position and rotation in the physical world, of the implant prior to it being picked up by or attached to the instrument and prior to performing the calibration method referred to above. A calibration rig can take many forms and includes a physical connection to the implant along with a physical connection to a fiducial marker. The fiducial marker is used to determine the pose of the calibration rig, and thereby the implant, at the time the calibration method is performed. The use of the calibration rig and calibration method is contingent upon knowing the planned position of the implant relative to the patient's anatomy.

In some aspects, the calibration rig is a physical replica of the physical anatomy (e.g., of the orbital cavity) of the patient. This physical replica is designed using a method described herein. For example, in terms of the orbital cavity, the method involves conversion of the preoperative imaging of the patient into a 3D surface accurately approximating the geometry of the patient's orbital cavity. Further, in some aspects, the method utilizes additive manufacturing to produce a physical replica of the patient's orbital cavity to the exact scale of the patient's actual orbit. This physical replica is used to shape the orbital implant, which is a common practice. Orbital implants are often a mesh designed to be deformed into shape to contour to the patient's orbital cavity. In some aspects, the implant is already shaped to the patient's anatomy, and therefore does not need to be shaped in a cavity, but a calibration step will still be applied.

Use of this calibration rig and calibration method in conjunction with augmented reality guidance provides a novel technique for the surgeon to place an implant. This approach allows for accuracy in placement well beyond what a naïve application of AR software would entail where a simple overlay of the implant in its desired location may be shown registered to the patient.

FIG. 1 is a diagram of a fiducial marker and a calibration rig construction representing a physical replica of an orbit of a patient. Calibration rig assembly 100 includes fiducial marker 110 affixed in a known position and orientation relative to implant support 120.

In an exemplary aspect, assembly 100 is specific to a patient and surgical case because implant support 120 is specific to a patient. In some aspects, implant support 120 may be generic for certain implants so long as the implant pose, or position and rotation in a physical space, may be unambiguously identified by fiducial marker 110.

Fiducial marker 110 may be any reference object that may be pre-programmed to the implant placement component stored on the AR headset memory for detection and subsequent pose estimation. Example standards of fiducial marker 110 include, but are not limited to, infrared retroreflective spheres, ArUco markers, or AprilTags. Fiducial marker 110 may be attached to implant support 120 using one or more of adhesives, fasteners, clips, rivets, wires, magnets, or Velcro, etc. In some aspects, components 110 and 120 may be a single, unitized component manufactured through additive manufacturing.

Fiducial marker 110 may be constructed from a rigid plastic material with a label indicating a binary optical pattern affixed to the surface. Alternatively, fiducial marker 110 may be produced using additive manufacturing, whereby two components are independently manufactured and joined. Marker 110 may alternatively be manufactured using techniques that allow multiple materials to be printed simultaneously.

Implant support 120 may be made from similar techniques to fiducial marker 110. In one example, such as for an orbital implant, implant support 120 is manufactured using additive manufacturing techniques, which allow for the complexity of the contours of a patient to be reproduced in a physical part. The examples provided herein are not limited to the types of manufacturing processes that may be employed to produce components 110 and 120 to yield assembly 100.

Figure 2:
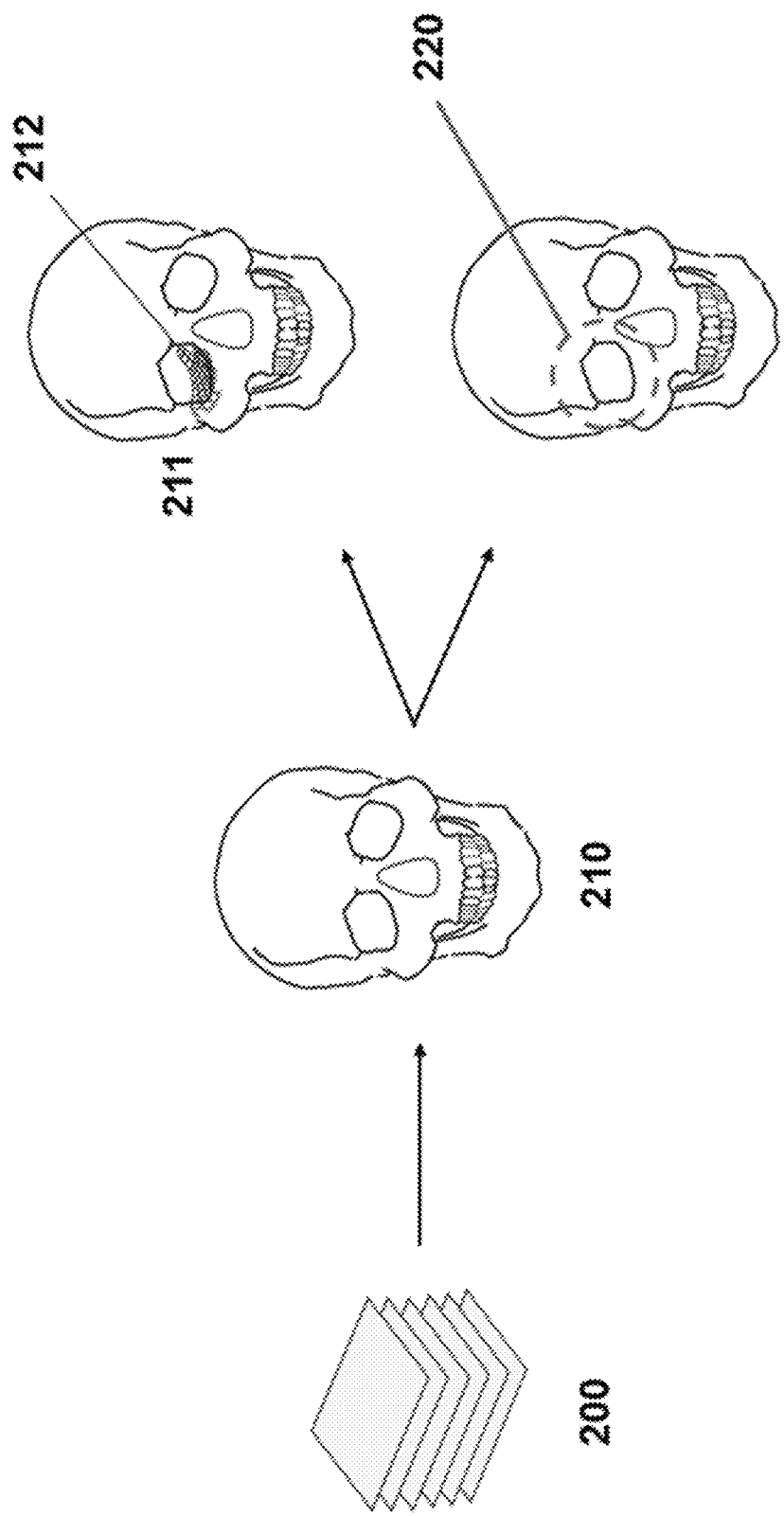
FIG. 2 is a diagram illustrating a process for converting preoperative imaging into three-dimensional models and determining a target location of an implant relative to the patient anatomy.

FIG. 2 is a diagram illustrating a process for converting preoperative imaging into three-dimensional models and determining a target location of an implant relative to the patient anatomy. Preoperative imaging 200 may include, but is not limited to, computed tomography (CT), cone beam CT (CBCT), magnetic resonance imaging (MRI) data, or some combination thereof. Such imaging typically includes stacks of two-dimensional images that represent a volume of the patient body along discrete planes. The process of segmentation converts these image stacks into one or more three-dimensional virtual anatomical models 210 that may be visualized in augmented reality and can also be used as an input for additive manufacturing. A set of virtual anatomical models 210 may include skin, skull, brain, and other internal anatomical structures, and may preserve the scale of the physical structures belonging to the patient.

Still referring to FIG. 2, once virtual anatomical models 210 are created, the target position 212 of the implant 211 along with areas of interest for a calibration rig, such as an implant support, may be defined for manufacture. Referring to creation of an implant support, in one example, an area of interest is the orbital cavity 220.

Figure 5:
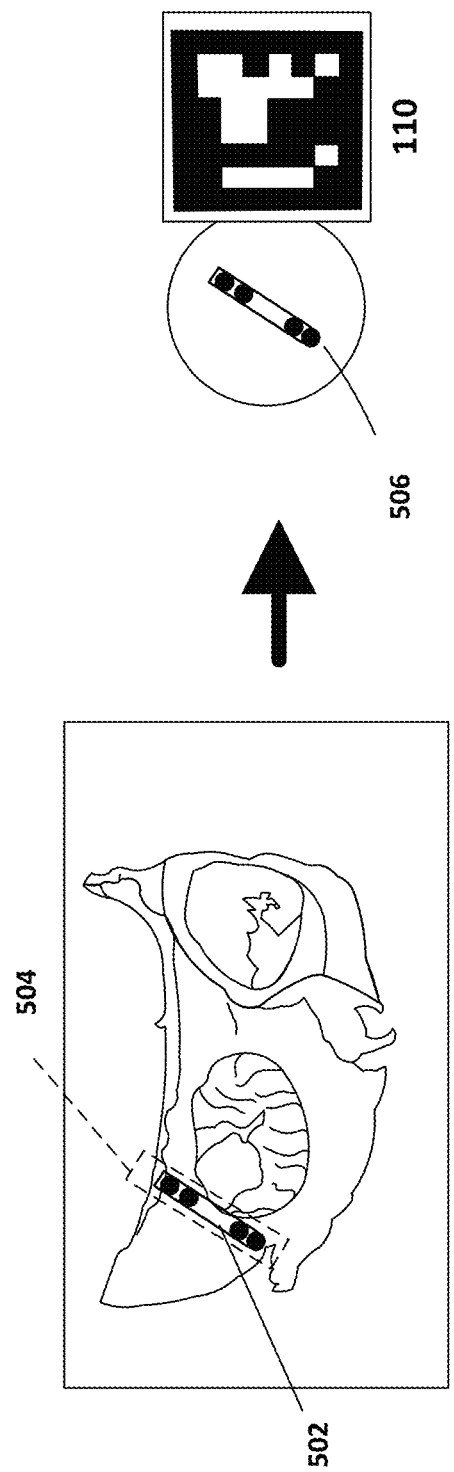
FIG. 5 is a diagram of a target position of an implant on a portion of a patient anatomy along with a schematic of a calibration rig.

FIG. 2 additionally shows the principle of determining a target position of an implant. As shown in FIG. 5, Implant 502 is placed relative to the anatomy into a target position 504 by a person skilled in the art and/or placed by the implant placement component configured to design and place implants. The target position 504 of the implant is crucial for the method, as the offset established in the calibration method will create a virtual fiducial position that the user can align a calibrated instrument to for accurate implant placement.

Figure 3:
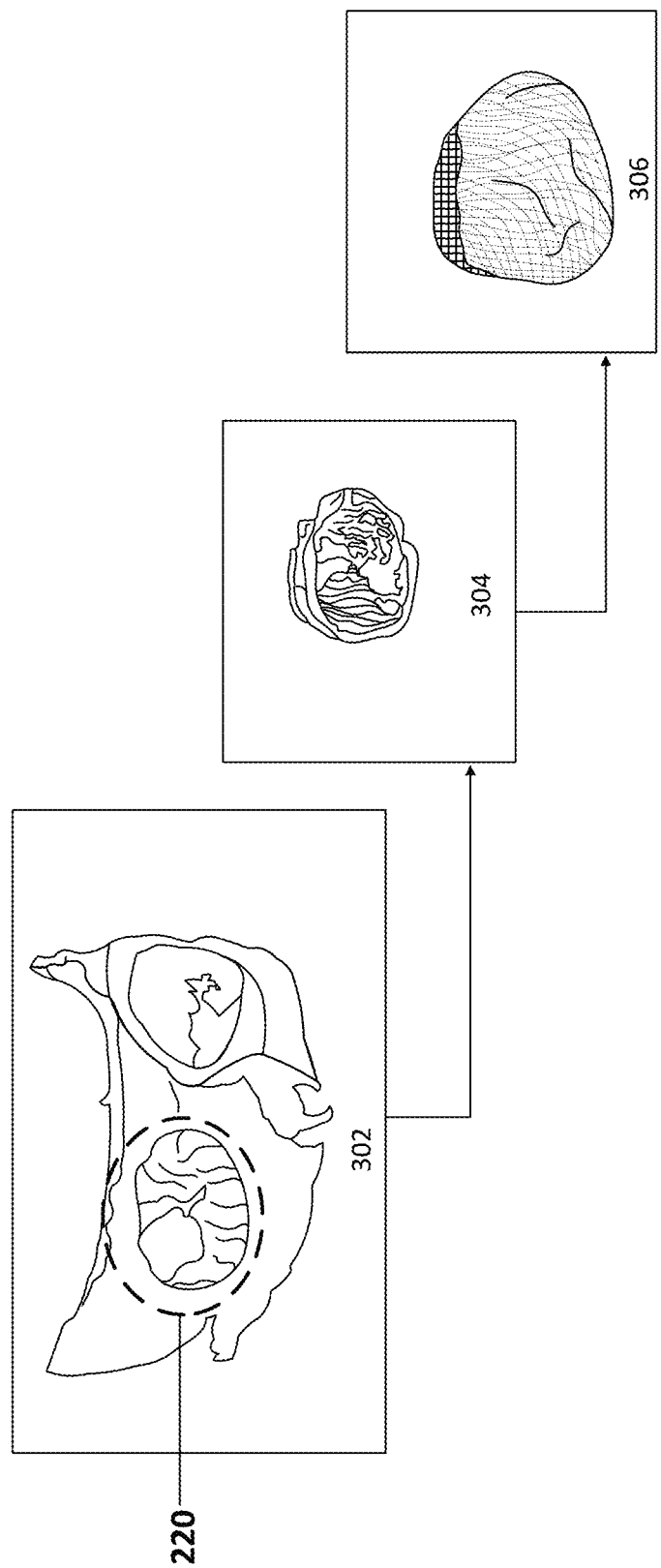
FIG. 3 is a diagram of the creation of a continuous three-dimensional surface that accurately reflects the size and shape of an orbital cavity.

FIG. 3 is a diagram of the creation of a continuous three-dimensional surface that accurately reflects the size and shape of an orbital cavity. More specifically, FIG. 3 illustrates a novel process of using an incomplete segmentation to accurately approximate and reconstruct a continuous surface of the orbital cavity. In practice, due to imaging artifacts and resolution limitations, the orbital cavity 220 often appears incomplete, comprised of a series of disconnected structures, or may appear "web-like." To construct implant support 120 of the orbit, a continuous three-dimensional surface is required.

Midface portion 302 is isolated from the models 210. The midface portion 302 includes the entirety of orbital cavity 220, even if the cavity itself is incomplete as illustrated in FIG. 3. The incomplete orbital cavity 304 is virtually cut from the midface portion 302 using image processing. Incomplete orbital cavity 304 is then processed using a novel reconstructive technique to obtain orbital surface 306 which is a complete surface that closely approximates that actual geometry of the orbital cavity of the patient. Surface 306 is used to manufacture the implant support 120. It should be noted that any part of the human anatomy may be modeled using the description in FIG. 3.

Figure 4:
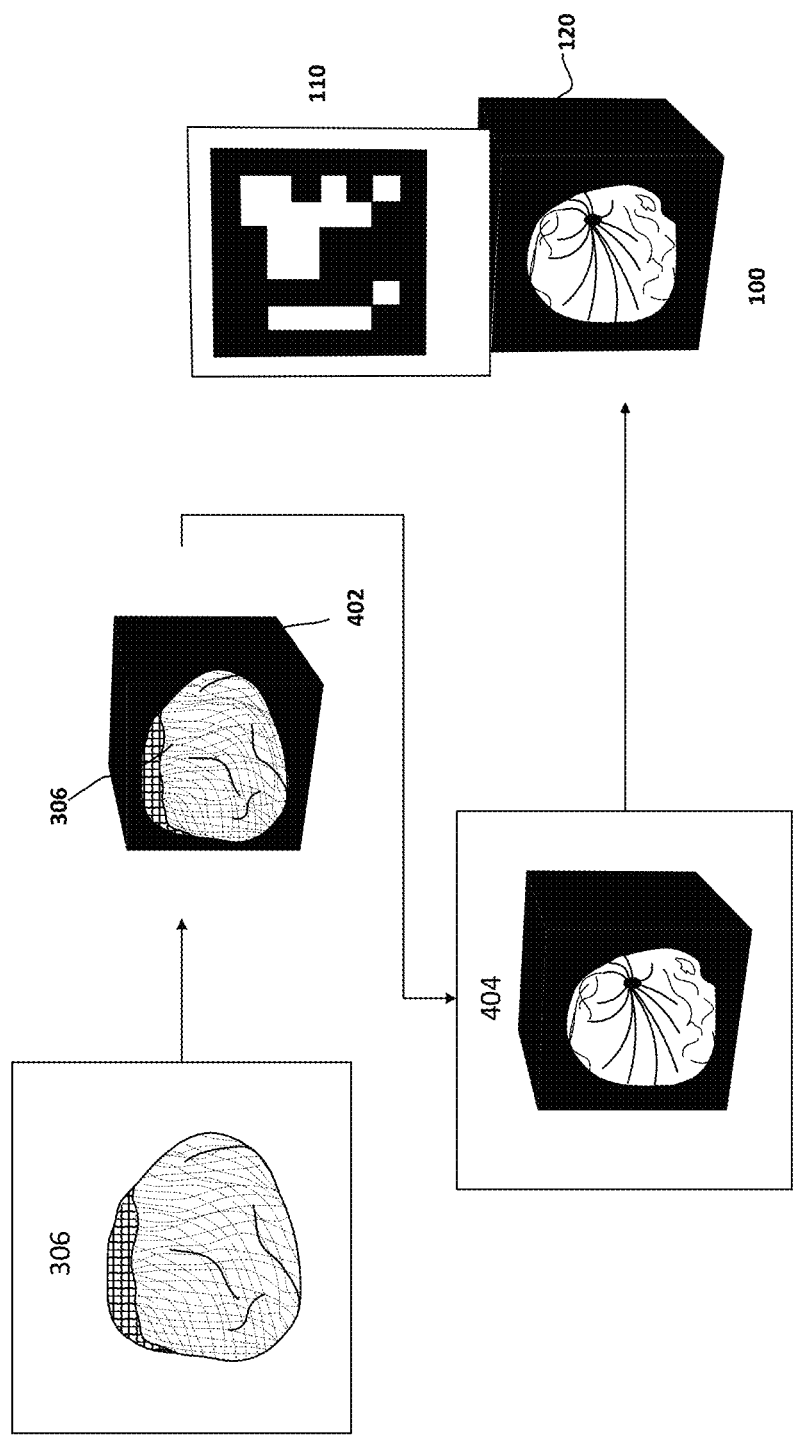
FIG. 4 is a diagram illustrating a method for designing and manufacturing a patient-specific physical replica of a portion of the patient anatomy.

FIG. 4 is a diagram illustrating a method for designing and manufacturing a patient-specific physical replica of a portion of the patient anatomy. In FIG. 4, a visual process flow is illustrated to convert processed orbital surface 306 into implant support 120 as part of assembly 100. Processed surface 306 is aligned to a cube using computer-aided modelling software. For example, SolidWorks™ or Onshape™ may be used to align a simple cube 402 of appropriate dimensions to the surface 306. Subsequently, the aligned surface 306 may be used to subtract the surface from the cube 402, creating a cavity structure in the side of the cube and yielding a single 3D object 404. Subsequently, object 404 may be provided as an input to additive manufacturing to print implant support 120.

FIG. 5 is a diagram of a target position of an implant on a portion of a patient anatomy along with a schematic of a calibration rig. An implant placement component first determines target implant position 504 of an implant 502. Implant 502 may be a wire, a mesh, a plate, a distractor, a set of screws or any sort of custom-shaped, patient-specific implant device to be used anywhere on the patient for any type of surgical case. A different embodiment of assembly 100 is illustrated here, with fiducial marker 110 attached to a calibration rig support 506 which is attached to implant 502. In this arrangement, fiducial marker 110 uniquely defines the pose of implant 502, as implant 502 can only be oriented and positioned in a single manner relative to fiducial marker 110. For certain implants, such as an acetabular cup, calibration rig assembly 100 may be incorporated into the implant packaging material and may not utilize any patient-specific components due to the standard geometry of the implant.

Figure 6:
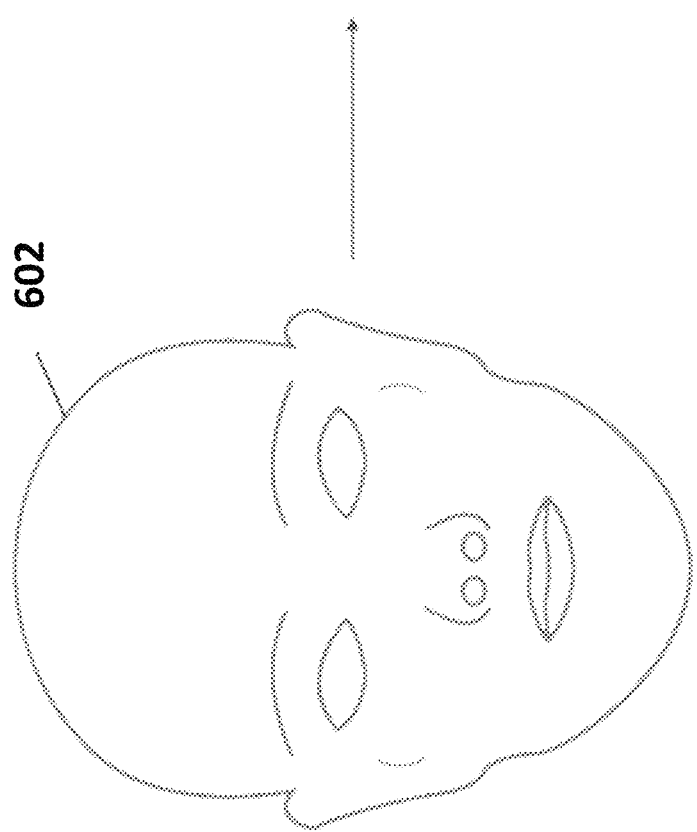
FIG. 6 is a diagram illustrating the principle of registration using augmented reality where the virtual patient data is superimposed onto the physical patient.
Figure 6:
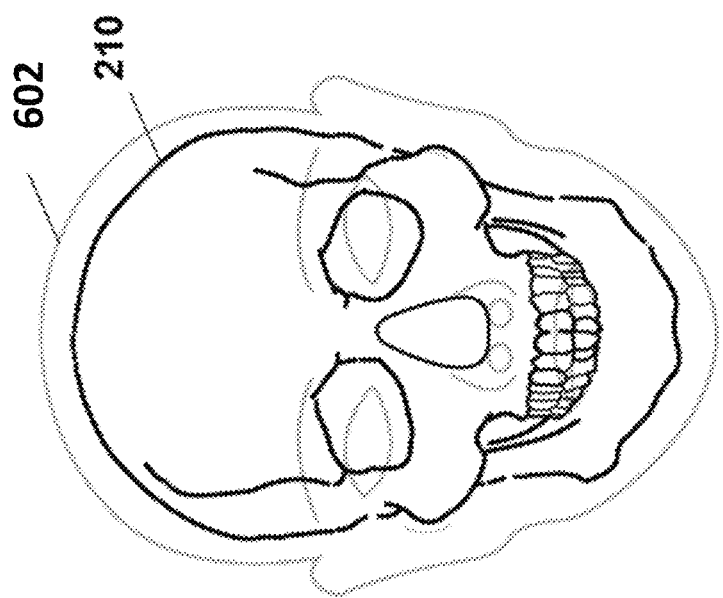

FIG. 6 is a diagram illustrating the principle of registration using augmented reality where the virtual patient data is superimposed onto the physical patient. In FIG. 6, the concept of registration is illustrated from a first-person perspective viewing a patient through an augmented reality headset. Patient 602 is viewed through the lenses of AR headset display 704 (see FIG. 7). The implant placement component then superimposes an overlay of virtual anatomical models 210 over the physical patient when viewed through the headset. By performing this registration step, the target position of the implant may be determined relative to the physical patient, thereby allowing for the target position of the calibrated instrument to be presented to the user as described in the proceeding paragraphs.

Figure 7:
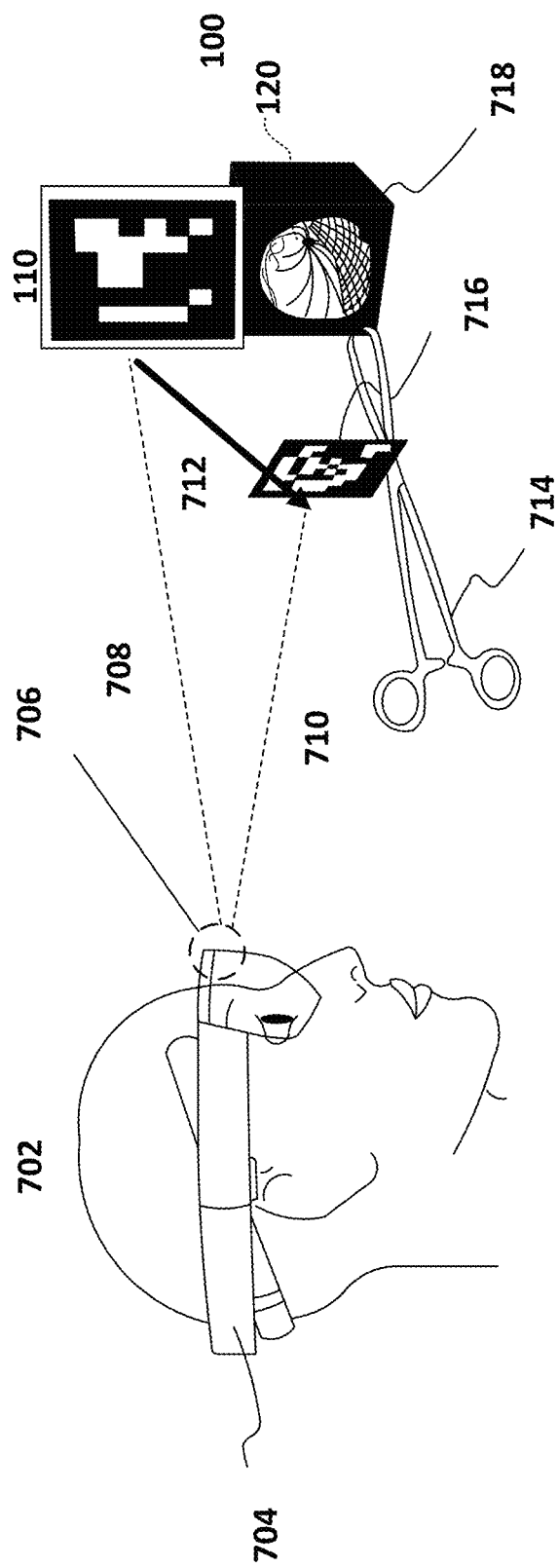
FIG. 7 is a diagram of an exemplary calibration procedure, whereby a relative position between the physical orbit replica and instrument used to place the orbital implant is established, which in turn allows for a virtual implant guide to be shown to the surgeon using the AR head-mounted display.

FIG. 7 is a diagram of an exemplary calibration procedure, whereby a relative position between the physical orbit replica and instrument used to place the orbital implant is established, which in turn allows for a virtual implant guide to be shown to the surgeon using the augmented reality head-mounted display. The surgeon or end user 702 wears an AR head-mounted display 704 that allows for co-visualization of digital overlays on the physical surroundings, including registration to a physical patient. The head-mounted display 704 is equipped with at least one camera 706, which can resolve the positions of a surgical instrument 714 with a fiducial marker 716 rigidly affixed to it, along with the position of calibration rig assembly 100 based on the position of fiducial marker 110 rigidly affixed to it. Camera 706 may be a full-color optical camera, an infrared camera, a greyscale camera, a time-of-flight camera, or other sensor device capable of imaging the environment for the purpose of determining the pose of one or more fiducial markers in the physical world.

Implant 718 is attached to calibration rig assembly 100. In a preferred embodiment, implant 718 is an orbital implant mesh and is shaped to match the inner contour of the implant support 120. Once implant 718 is shaped into the desired form, surgical instrument 714 (e.g., Kelly clamps) is used to place implant 718 in the patient.

At this stage, user 702 instructs the implant placement component running on AR headset 704 to perform a calibration process. The calibration instruction may be performed by a voice command captured by a microphone on the AR headset, or may be performed using a gesture instruction, a wireless or wired controller, or using any other interface available through the AR headset and programmed to interact with the implant placement component software logic.

In response to an instruction for calibration to begin, the implant placement component interfaces with AR headset camera 706 and its sensors to search (e.g., using image classification or matching) the environment for the presence of fiducial markers 110 and 716, which correspond to the calibration rig assembly 100 and surgical instrument 714 respectively. In response to the fiducial markers 110 and 716 being detected, the implant placement component on AR headset 704 performs pose estimations 708 and 710 to markers 110 and 716, respectively. The pose estimations provide translation and rotation data of each marker, thereby allowing the implant placement component to unambiguously and accurately determine a relative pose, henceforth an offset 712, between the two markers. This pose offset 712 is used in a subsequent step to project a target placement of a virtual fiducial marker, which provides a convenient and accurate reference to a surgeon on implant placement and avoids the ambiguity of having to co-visualize the implant directly on the patient and/or to rely on other less accurate techniques for placement guidance. Alternatively, it is anticipated that certain implants where certain symmetries are present (e.g., an acetabular cup with rotational symmetry), only a depth offset from an instrument fiducial marker may be necessary for positioning the virtual fiducial marker. In such instances, other methods to define offset 712 may be used, such as use of machine vision to detect the size or shape of an implant from its packaging, or voice input by the end user to specify a length of the offset.

In some aspects, the implant position may be determined without using a fiducial marker or physical calibration rig. For example, in certain scenarios such as for cerebral shunt placement, a target virtual fiducial position is displayed via the AR-device relative to a physical fiducial marker on the surgical instrument/the implant (e.g., a catheter). The position of the target virtual fiducial position is determined by a machine learning model trained to recognize a label on the implant package and determine an offset between the target virtual fiducial position and the physical fiducial marker. The machine learning model may be trained by using a dataset comprising images of implant packages with various labels and a target offset. The training process may involve teaching the model to accurately identify these labels and calculate the offset between the target virtual fiducial position and the physical fiducial marker on the surgical instrument/the implant. This may be achieved through supervised learning, where the model learns from labeled examples to predict the correct offset, thereby enabling precise implant positioning.

Figure 8:
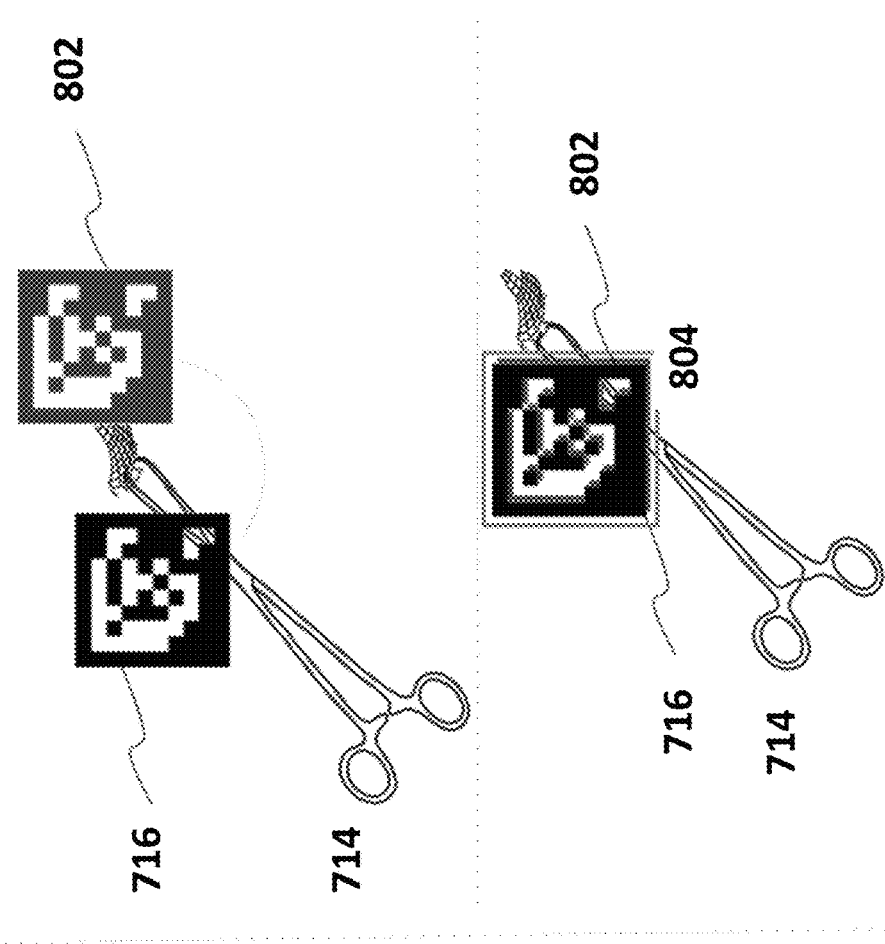
FIG. 8 is a diagram illustrating a visual guide for alignment and placement of an implant using the AR head-mounted display.
Figure 8:
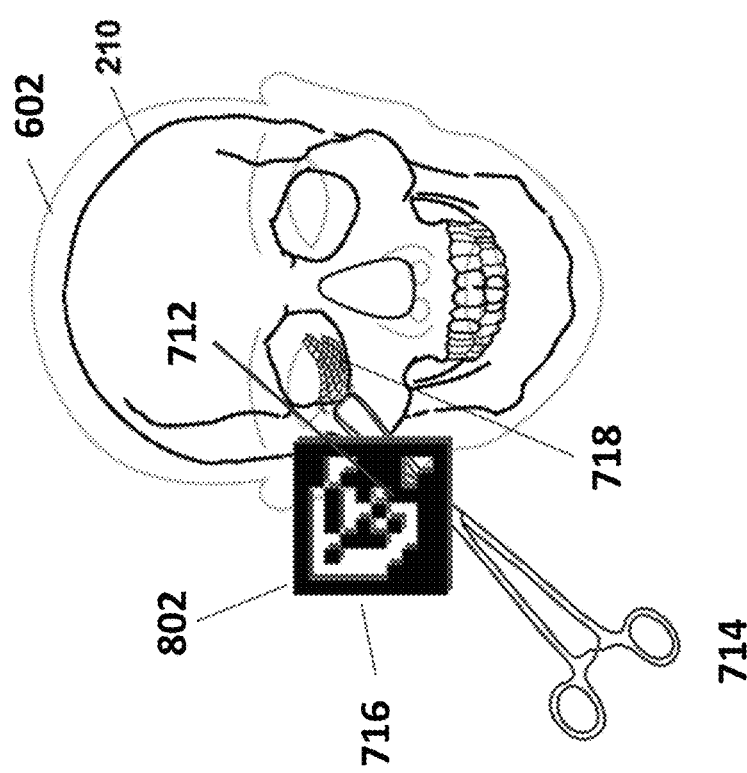

FIG. 8 is a diagram illustrating a visual guide for alignment and placement of an implant using the augmented reality head-mounted display. It should be noted that FIG. 8 represents a first-person viewpoint through the AR headset 704 by user 702 as shown in FIG. 7.

The implant placement component segments models 210 from preoperative imaging 200 and further registers and superimposes models 210 physical patient 602. The surgeon uses surgical instrument 714 with affixed fiducial marker 716 to begin placement of shaped orbital implant 718 into position.

The implant placement component projects a virtual fiducial marker 802 through the AR headset in response to receiving user command(s) via similar interfaces to the calibration command. This virtual fiducial marker 802 corresponds to the same fiducial marker identity as the physical fiducial marker 716 attached to surgical instrument 714. The implant placement component projects virtual fiducial marker 802 at the position of the desired placement for implant 718.

Once the virtual anatomical models 210 are registered to the physical patient 602, the target position of the implant relative to the patient is unambiguously known relative to the physical environment, and therefore the target position of the calibrated instrument is defined and represented using a virtual fiducial marker. Specifically, the implant placement component performs the projection of virtual fiducial marker 802 in space at the correct location because the implant placement component has aligned 3D model datasets 210 to the physical patient, and because in the previous step (FIG. 7) an offset 712 was assigned to the preferred location of surgical instrument 714 with attached implant 718 relative to the implant support 120.

Subsequent to instructing the implant placement component on the AR headset to project the target location, virtual fiducial marker 802 appears at a fixed position in space, as viewed through AR headset 704 (not shown in the figure). The surgeon then moves the calibrated instrument 714 with attached implant into the position where virtual fiducial marker 802 and physical fiducial marker 716 are coincident. As physical marker 716 becomes sufficiently coincident with virtual marker 802, the user interface (UI) in the AR headset changes to show a positive indication. For instance, UI indicator 804 shows an outline when the Euclidean pose difference between virtual and physical markers 716 and 802 is less than 2 mm and/or angular difference is less than 2 degrees.

Figure 9:
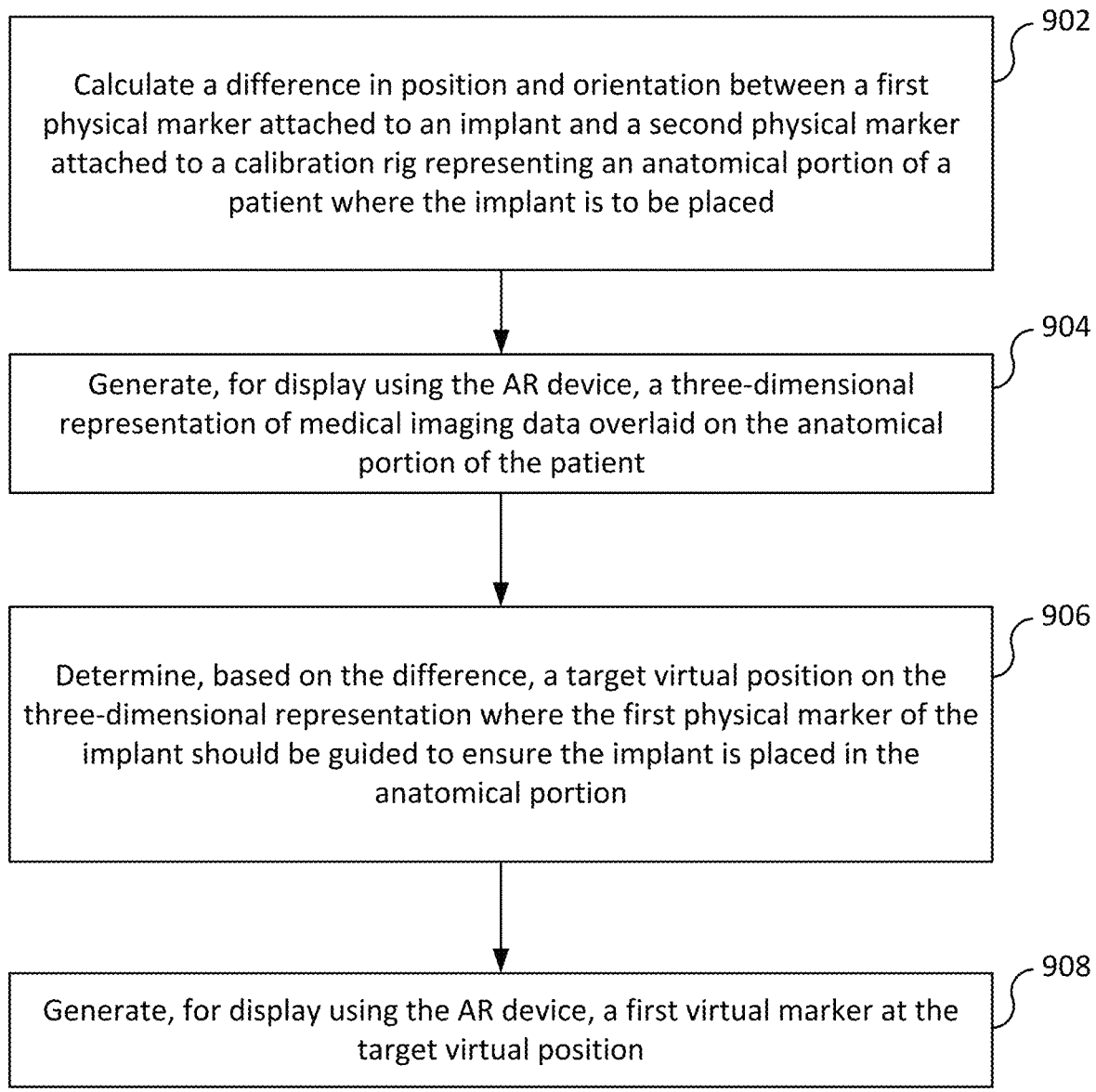
FIG. 9 is a flow diagram of a method for implant placement using an AR device.

FIG. 9 is a flow diagram of method 900 for implant placement using an AR device. Method 900 is executed by an implant placement component, which is software that may be installed on a computer device (described in FIG. 12). In some aspects, the computer device is the AR device (e.g., AR-enabled glasses, AR-enabled smartphone, etc.) and all steps of method 900 are performed onboard. In some aspects, the implant placement component is split into one or more applications. The first application may be installed on the AR device and is configured to perform visualization steps. The second application may be installed on a secondary computer device and is configured to perform intensive processing steps (e.g., calculations, registration, etc.). The secondary computer device and the AR device may be connected by a wired (e.g., USB cable) or wireless connection (e.g., Bluetooth). In some aspects, the secondary computer device is a remote server and the wireless connection is established in a wide area network (e.g., the Internet).

In step 902, the implant placement component calculates a difference in position and orientation between a first physical marker (e.g., marker 716) attached to an implant (e.g., implant 211) and a second physical marker (e.g., marker 110) attached to a calibration rig (e.g., assembly 100) representing an anatomical portion of a patient where the implant is to be placed. This difference is specifically calculated when the implant is placed in/on the calibration rig representing proper placement of the implant in its target location.

For example, the implant placement component may calculate both the translational and rotational differences between the two markers 110 and 716. The translational difference may be computed as the vector difference between the positions of the two markers in a three-dimensional coordinate system. The rotational difference may be determined by comparing the orientation of the markers, which may be represented using rotation matrices.

In some aspects, the first physical marker is one or a combination of: an optical code, an infrared retroreflective sphere, and an electromagnetic tracker.

In step 904, the implant placement component generates, for display using the AR device, a three-dimensional representation (e.g., model 210) of medical imaging data overlaid on the anatomical portion (e.g., an area focused around the orbital cavity) of the patient 602.

In some aspects, the three-dimensional representation of the medical imaging data is generated using a plurality of individual medical images of at least the anatomical portion (e.g., preoperative imaging 200).

In some aspects, the implant placement component registers the three-dimensional representation over the anatomical portion based at least on landmarks shared between the three-dimensional representation and the anatomical portion. For example, shared landmarks are specific, identifiable points that exist both in the 3D model and on the patient's anatomy, such as bony prominences or anatomical features like the tip of a bone or a specific contour. By identifying and matching these landmarks in both the virtual and physical spaces, the implant placement component may accurately overlay the 3D representation onto the patient's anatomy. Alternatively, the implant placement component may register the three-dimensional representation using a patient-specific guide, such as a dental implant, or by use of machine vision, surface scanning and matching, or other techniques known in the art.

In step 906, the implant placement component determines, based on the difference, a target virtual position and target orientation on the three-dimensional representation where the first physical marker of the implant should be guided to ensure the implant is placed in the anatomical portion.

The difference between the two markers in step 902 represents a relative difference of the first physical marker of the implant from the second physical marker of the calibration rig. Accordingly, if the calibration rig is oriented in any way or moved around, the position and orientation of the implant can be estimated using the relative difference.

During an operation on a patient, the implant placement component may utilize image processing to detect, on the patient, the specific anatomical portion that is replicated by the calibration rig. The implant placement component may then estimate the orientation and position of the anatomical portion as detected on the patient in during calibration and generate an anatomical virtual marker (e.g., marker 802) that represents where the second physical marker would be placed if the physical replica of the anatomical portion and the actual anatomical portion were aligned. The difference calculated in step 902 may then be used to estimate where the first physical marker should be positioned (i.e., the target virtual position) and how the first physical marker should be oriented (i.e., the target orientation) relative to the anatomical virtual marker.

In step 908, the implant placement component generates, for display using the AR device, a first virtual marker at the target virtual position in the target orientation. For example, if the difference indicates that the marker of the implant is 5 mm to the left and rotated 10 degrees clockwise from the anatomical portion, the target virtual position and orientation are updated to show where the first physical marker should be moved to achieve proper alignment. This process involves translating the first virtual marker by 5 mm to the right of the anatomical portion and counter-rotating it by 10 degrees to match the intended orientation.

It should be noted that the position and orientation of the first virtual marker relative to the anatomical virtual marker matches the position and orientation of the first physical marker relative to the second physical marker when the implant is properly placed in the calibration rig.

In some aspects, the first virtual marker matches a visual appearance of the first physical marker. An alignment of the first virtual marker and the first physical marker is indicative of proper placement of the implant in the anatomical portion. In some aspects, the implant placement component outputs an alert indicative of the proper placement in response to detecting that the first physical marker aligns with the first virtual marker. For example, the alert may be one or more of: a visual indication (e.g., a color change or outline of the virtual marker), an audio indication (e.g., a beep), and a haptic indication (e.g., a slight vibration of the AR device or the instrument used to place the implant).

In some aspects, the first physical marker is attached to a surgical instrument temporarily connected to the implant. For example, the surgical instrument may be a clamp that holds the implant. The implant placement component may determine an offset between the implant and a point of connection of the first physical marker on the surgical instrument, and adjust the target virtual position and the target orientation based on the offset. For example, if the first physical marker has been shifted 3 cm to the right from its position on the implant and has been rotated by 3 degrees clockwise when connected to the surgical instrument, the target virtual position may also be shifted 3 cm to the right and the first virtual marker may be rotated by 3 degrees clockwise. The offset ensures that the implant is properly placed where its intended in/on the patient.

Figure 10:
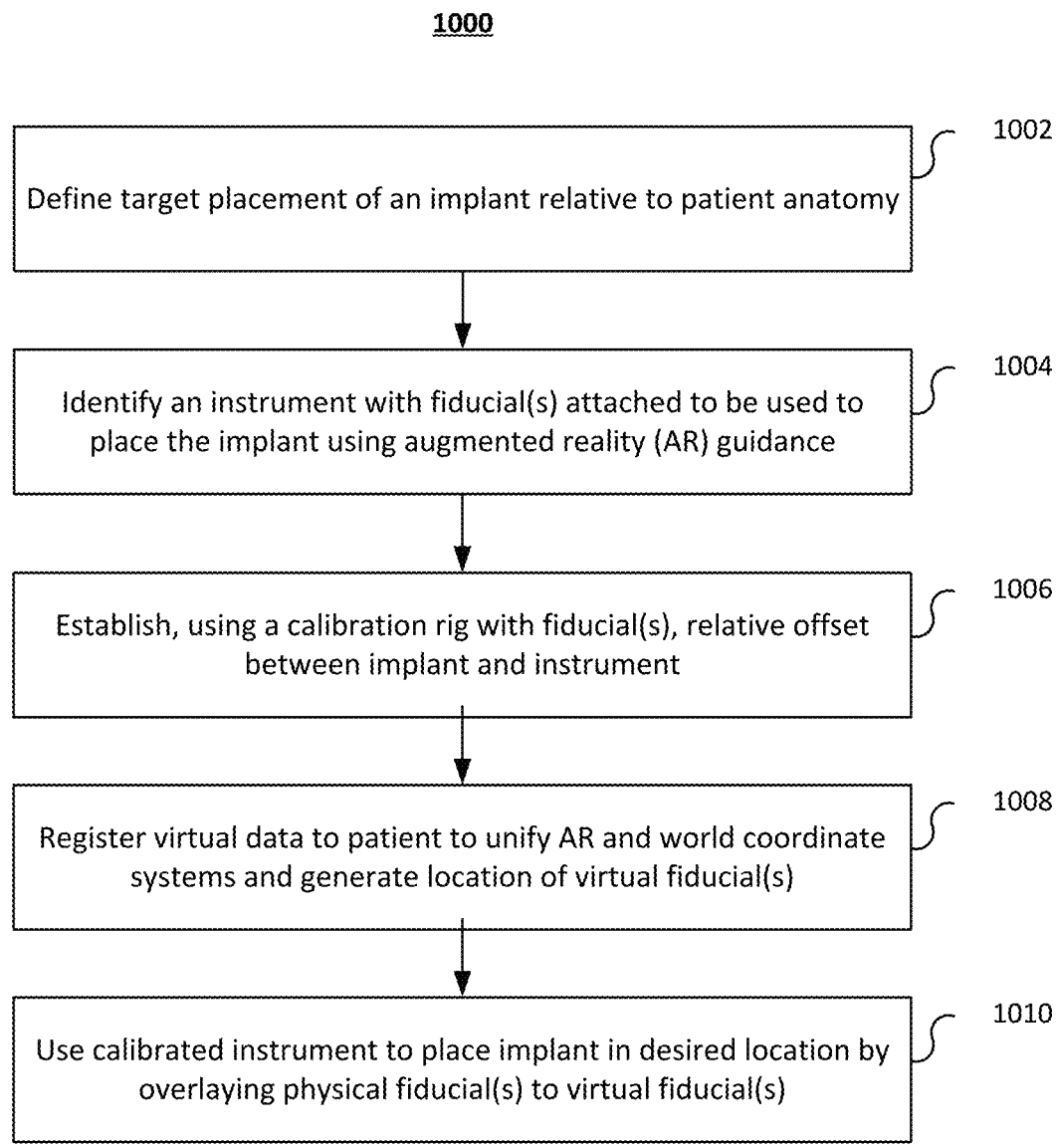
FIG. 10 is a flow diagram of a method for AR-aided placement of an implant.

FIG. 10 is a flow diagram of a method 1000 for placement of an implant. Method 1000 is to be used by a user, such as a surgeon, wearing an augmented reality (AR) headset that has software (e.g., an implant placement component) stored on its computer-readable memory able to execute the instructions described herein. Steps 1002 to 1010 are not the exhaustive list of steps comprising the method, nor is it necessary that these steps be carried out in exactly the sequence provided below.

In step 1002, an implant placement software defines a target placement of an implant based on the preoperative segmentation of imaging data (CT, MRI, etc.). In step 1004, the implant placement component identifies an instrument to be calibrated. This instrument will be used to place the implant in the desired position on or within the patient. The instrument has a fiducial marker(s) attached to it in a known position on the instrument. The fiducial marker(s) are optical codes, infrared retroreflective spheres, or other characteristic patterns that are arranged in a predetermined pattern as described herein.

In step 1006 of FIG. 10, the implant placement component determines, using a calibration rig equipped with a fiducial marker(s), the pose of the implant in the physical space of the user. When the instrument described in step 1004 is in contact with the implant, and in response to an instruction by the user to the implant placement component, the implant placement component records the pose of the calibration rig with attached implant. Simultaneously or at a known time interval from this instruction, the pose of the fiducial marker attached to the instrument is determined by the implant placement component, which calculates a relative pose, or offset, between the calibration rig and the instrument.

In step 1008, the implant placement component registers the virtual anatomical data segmented from the patient's preoperative imaging data (CT, MRI, etc.) to the patient, resulting in a superimposed set of virtual anatomical models onto the physical patient. Further, this step results in defining the target implant position relative to the physical patient, thereby also defining the position of the target virtual fiducial marker to be used as a reference to position the instrument for implant placement.

In step 1010, the calibrated instrument is used to place the implant into the desired location by overlaying the physical fiducial marker attached to it into a position that coincides with the virtual fiducial marker projected through the AR headset onto or adjacent to the patient, based on the registered virtual anatomical overlays. The user may receive feedback through a user interface on the AR headset, including visual feedback, audio feedback and haptic feedback, to guide the instrument into its target position by aligning the physical fiducial marker to the virtual one.

Figure 11:
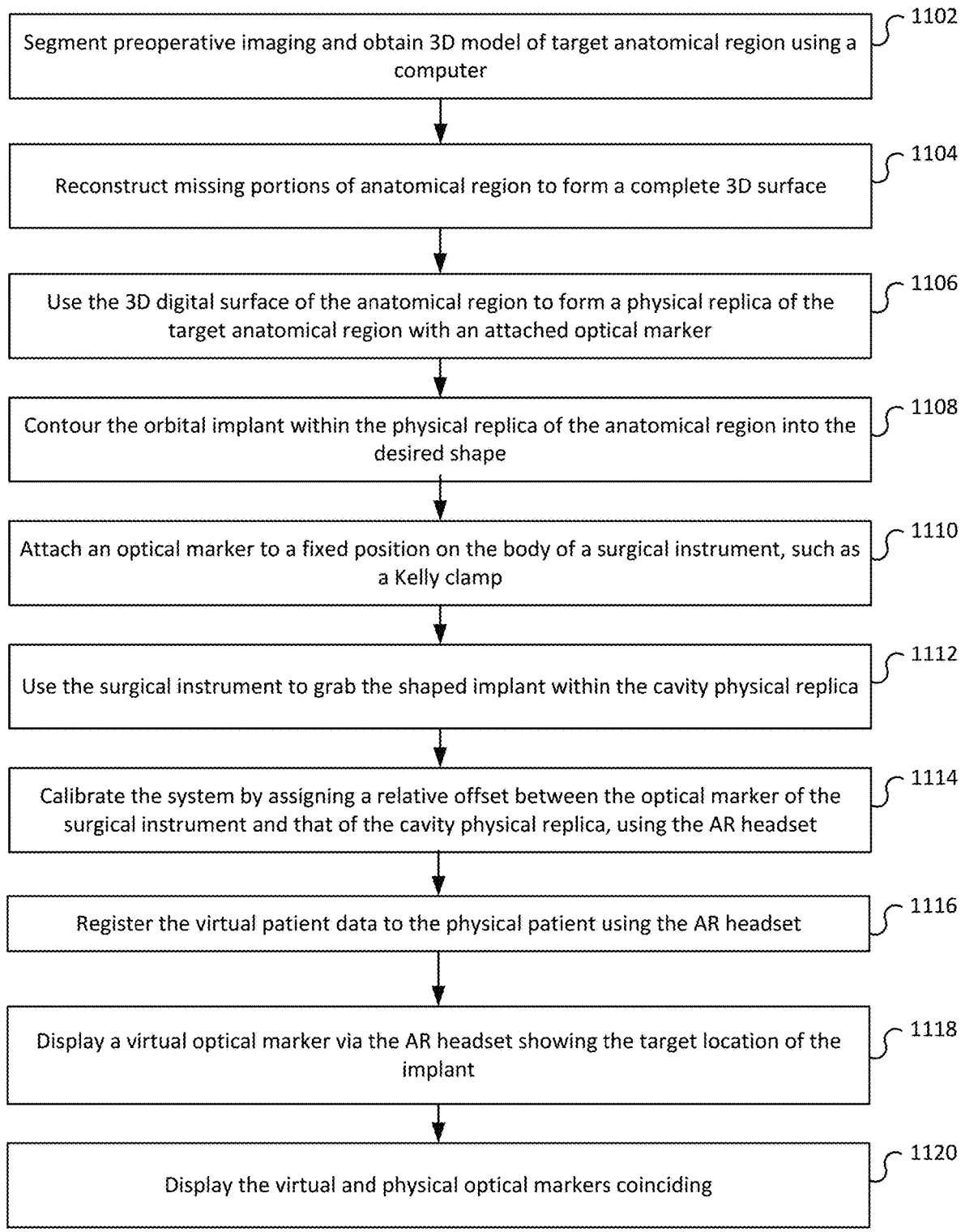
FIG. 11 is a flow diagram of a detailed method for AR-aided placement of an implant.

FIG. 11 is a flow diagram of a detailed method 1100 for placement of an implant. In step 1102, the implant placement component segments the preoperative imaging into 3D data, which includes, for example, the patient orbital cavity or cavities to be used for manufacture of the implant support. This was schematically represented in FIG. 2.

In step 1104, incomplete or broken surfaces of the virtual orbital cavity surface created from the segmentation process of step 1102 are reconstructed using an implant placement component. A full reconstruction of the surface is necessary to construct the physical replica of the orbit to be used as the implant support.

In step 1106, the processed 3D model of the orbital cavity following the optional step 1104 is used by the implant placement component to construct a digital model for the physical replica of the orbit that may be manufactured using techniques known in the art, such as additive manufacturing.

In step 1108, the manufactured implant support is used to shape the orbital implant by the surgeon. The physical replica of the orbit has a fiducial marker attached to it, as shown in FIG. 1, which is used by the implant placement component to assign a relative position or pose using the camera on the AR headset. In two preferred embodiments of this exemplary method, the fiducial marker attached to the calibration rig and implant support is either an ArUco marker or a rigid array with at least three infrared retroreflective spheres arranged in a unique planar pattern.

In steps 1110 and 1112, the surgical instrument used to manipulate the shaped orbital implant into place is located using an optical marker which is different in identity to the one used for locating the calibration rig. The relative poses—the translational and rotational position in space—between the two markers are used in subsequent steps to project a target position of the surgical instrument and optical marker assembly.

In step 1114, the implant placement component calibrates the relative pose between the two markers. In step 1116, the virtual 3D model data is registered to the physical patient. In step 1118, thereby allowing for the target position of a virtual optical marker for the surgical instrument or clamp to be projected in a fixed position in space. This target position is viewable through the AR headset, and is projected in position based both on the relative pose measurement (i.e., calibration) and the registration of the virtual 3D model data to the physical patient.

In step 1120, the surgeon uses the projected virtual fiducial marker position as a reference on the target position to place the implant. The surgeon positions the surgical instrument or clamp with affixed physical fiducial marker into a position that aligns the optical marker to coincide with the virtual fiducial marker which is fixed in space. The user interface of the implant placement component, as viewed through the AR headset, adjusts to provide feedback to the user in real-time as the virtual and physical fiducial markers begin to coincide.

Figure 12:
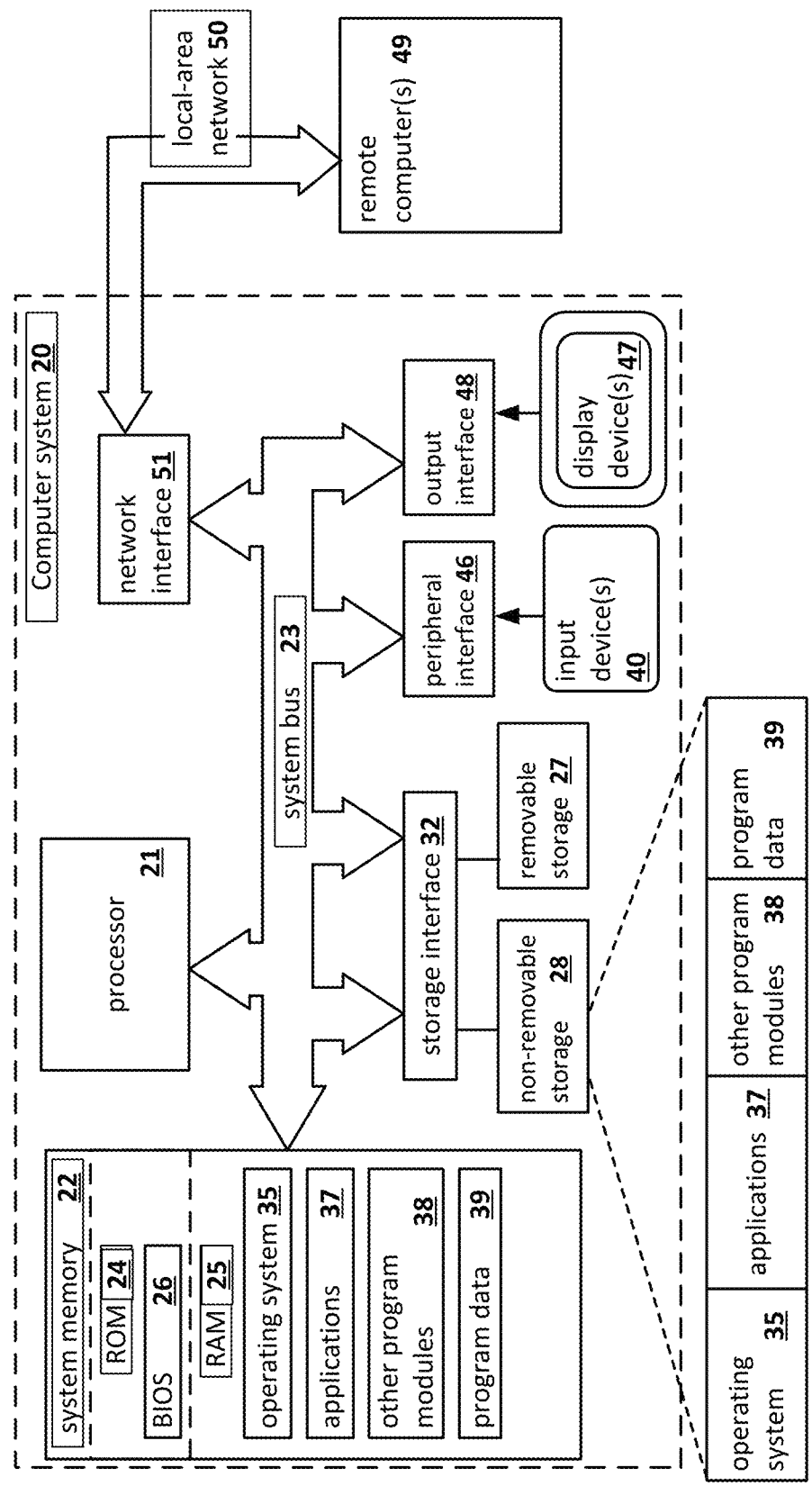
FIG. 12 is a block diagram illustrating a computer system on which aspects of systems and methods for AR-aided implant placement may be implemented in accordance with an exemplary aspect.

FIG. 12 is a block diagram illustrating a computer system 20 on which aspects of systems and methods for augmented reality-aided implant placement may be implemented in accordance with an exemplary aspect. The computer system 20 may be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-11 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which may be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium may be a tangible device that can retain and store program code in the form of instructions or data structures that may be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein may be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure may be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for implant placement using an augmented reality (AR) device, the method comprising:
   calculating a difference in position and orientation between a first physical marker attached to an implant and a second physical marker attached to a calibration rig representing an anatomical portion of a patient where the implant is to be placed;
   generating, for display using the AR device, a three-dimensional representation of medical imaging data overlaid on the anatomical portion of the patient;
   determining, based on the difference, a target virtual position and target orientation on the three-dimensional representation where the first physical marker of the implant should be guided to ensure the implant is placed in the anatomical portion; and
   generating, for display using the AR device, a first virtual marker at the target virtual position in the target orientation, wherein the first virtual marker matches a visual appearance of the first physical marker.

2. The method of claim 1, wherein an alignment of the first virtual marker and the first physical marker is indicative of proper placement of the implant in the anatomical portion.

3. The method of claim 2, further comprising outputting an alert indicative of the proper placement in response to detecting that the first physical marker aligns with the first virtual marker.

4. The method of claim 3, wherein the alert is one or more of: a visual indication, an audio indication, and a haptic indication.

5. The method of claim 1, the first physical marker is attached to a surgical instrument temporarily connected to the implant.

6. The method of claim 5, further comprising:
determining an offset between the implant and a point of connection of the first physical marker on the surgical instrument; and
adjusting the target virtual position and the target orientation based on the offset.

7. The method of claim 6, wherein the offset is determined from a label packaged with the implant.

8. The method of claim 1, wherein the first physical marker is one or a combination of: an optical code, an infrared retroreflective sphere, and an electromagnetic tracker.

9. The method of claim 1, wherein the three-dimensional representation of the medical imaging data is generated using a plurality of individual medical images of at least the anatomical portion.

10. The method of claim 1, wherein generating the three-dimensional representation of the medical imaging data comprises registering the three-dimensional representation over the anatomical portion.

11. The method of claim 1, wherein the calibration rig comprises a physical replica of the anatomical portion.

12. A system for implant placement, comprising:
an augmented reality (AR) device;
at least one memory; and
at least one hardware processor coupled with the at least one memory and configured, individually or in combination, to:
calculate a difference in position and orientation between a first physical marker attached to an implant and a second physical marker attached to a calibration rig representing an anatomical portion of a patient where the implant is to be placed;
generate, for display using the AR device, a three-dimensional representation of medical imaging data overlaid on the anatomical portion of the patient;
determine, based on the difference, a target virtual position and target orientation on the three-dimensional representation where the first physical marker of the implant should be guided to ensure the implant is placed in the anatomical portion; and
generate, for display using the AR device, a first virtual marker at the target virtual position in the target orientation, wherein the first virtual marker matches a visual appearance of the first physical marker.

13. The system of claim 12, wherein an alignment of the first virtual marker and the first physical marker is indicative of proper placement of the implant in the anatomical portion.

14. The system of claim 13, wherein the at least one hardware processor is further configured to output an alert indicative of the proper placement in response to detecting that the first physical marker aligns with the first virtual marker.

15. The system of claim 14, wherein the alert is one or more of: a visual indication, an audio indication, and a haptic indication.

16. The system of claim 12, wherein the first physical marker is attached to a surgical instrument temporarily connected to the implant.

17. The system of claim 12, wherein the at least one hardware processor is further configured to:
determine an offset between the implant and a point of connection of the first physical marker on the surgical instrument; and
adjust the target virtual position and the target orientation based on the offset.

18. A non-transitory computer readable medium storing thereon computer executable instructions for implant placement using an augmented reality (AR) device, including instructions for:
calculating a difference in position and orientation between a first physical marker attached to an implant and a second physical marker attached to a calibration rig representing an anatomical portion of a patient where the implant is to be placed;
generating, for display using the AR device, a three-dimensional representation of medical imaging data overlaid on the anatomical portion of the patient;
determining, based on the difference, a target virtual position and target orientation on the three-dimensional representation where the first physical marker of the implant should be guided to ensure the implant is placed in the anatomical portion; and
generating, for display using the AR device, a first virtual marker at the target virtual position in the target orientation, wherein the first virtual marker matches a visual appearance of the first physical marker.

\* \* \* \* \*